United States Patent [19]

Rosenfeld

[11] Patent Number: 4,824,895
[45] Date of Patent: Apr. 25, 1989

[54] STABILIZED AROMATIC POLYESTER COMPOSITIONS

[75] Inventor: Jerold C. Rosenfeld, Tonawanda, N.Y.

[73] Assignee: Celanese Corporation, New York, N.Y.

[21] Appl. No.: 114,850

[22] Filed: Oct. 30, 1987

Related U.S. Application Data

[62] Division of Ser. No. 833,643, Feb. 25, 1986, abandoned.

[51] Int. Cl.$^4$ .......................... C08K 5/06; C08G 65/48
[52] U.S. Cl. ..................................... 524/370; 524/539; 524/540; 525/397
[58] Field of Search ....................... 524/370, 539, 540; 525/444, 397

[56] References Cited

U.S. PATENT DOCUMENTS

| | | | |
|---|---|---|---|
| 3,946,091 | 3/1976 | Sakata et al. | 524/444 |
| 4,517,328 | 5/1985 | Schmidt et al. | 524/370 |
| 4,614,773 | 9/1986 | Sugio et al. | 525/397 |
| 4,746,710 | 5/1988 | Dickinson et al. | 525/397 |

FOREIGN PATENT DOCUMENTS

| | | | |
|---|---|---|---|
| 58404 | 8/1982 | European Pat. Off. | 524/370 |
| 159847 | 9/1984 | Japan | 525/397 |

*Primary Examiner*—Kriellion Morgan
*Attorney, Agent, or Firm*—Depaoli & O'Brien

[57] ABSTRACT

An aromatic polyester composition comprising an aromatic polyester derived from terephthalic acid and/or isothalic acid and a bisphenol and a stabilizer chosen from P-containing organic esters, O, S, or F-containing organic compounds or their mixtures.

9 Claims, No Drawings

STABILIZED AROMATIC POLYESTER COMPOSITIONS

This application is a division, of application Ser. No. 833,643, filed 2/25/86, now abandoned.

BACKGROUND OF THE INVENTION

This invention relates to a stabilized aromatic polyester composition and, more specifically, to a stabilized aromatic polyester composition including P, O, S, or F-containing organic compounds or their mixtures. The aromatic polyester used in this invention is obtained from terephthalic acid and/or functional derivatives thereof; isophthalic acid and/or functional derivatives thereof; or mixtures thereof (with the terephthalic acid-/isophthalic acid unit mole ratio being about 9:1 to about 1:9) and a bisphenol of the following general formula (I)

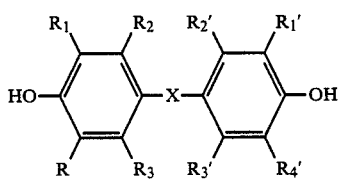

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each represents a member selected from the group consisting of a hydrogen atom, a chlorine atom, a bromine atom and an alkyl group containing 1 to 4 carbon atoms, or functional derivatives thereof.

Known methods for producing such an aromatic polyester include, for example, an interfacial polymerization method which involves mixing an aromatic dicarboxylic acid chloride dissolved in a water-immiscible organic solvent with an alkaline aqueous solution of a bisphenol, a solution polymerization method which comprises heating a bisphenol and an acid chloride in an organic solvent, and a melt polymerization method which comprises heating a phenyl ester of an aromatic dicarboxylic acid and a bisphenol, e.g., as disclosed in U.S. Pat. Nos. 3,884,990 and 3,946,091.

It is also known that aromatic polyesters derived from aromatic dicarboxylic acids and bisphenols have superior properties to polyesters derived from aromatic dicarboxylic acids and aliphatic alkylene glycols. Specifically, these polyesters have many superior characteristics, e.g., mechanical properties such as tensile strength, elongation, flexural strength, flexural recovery and impact strength, heat-distortion temperature, dimensional stability, electrical properties, and fire retardancy. Because of these superior properties, these polyesters are known to be useful in a wide range of fields as various molded articles, films, fibers, and coating materials obtained by extrusion moldinq, injection molding, etc.

The aromatic polyesters obtained by the above methods frequently assume yellow or brown colors in their as-prepared state. It is also noted that aromatic polyesters turn yellow when heated during injection molding, extrusion molding and other shaping operations which are used to form ordinary molded products or films. Such coloration is extremely inconvenient when a lack of color in the resulting molded articles is important. Furthermore, when a pigment is incorporated into a molding composition to obtain a desired color, the color of the final molded product frequently is quite different from the desired color.

The aromatic polyesters used in this invention have a high heat distortion temperature, and therefore, are frequently used under high temperature conditions. The above-described coloration, however, proceeds generally under high temperature conditions and impairs the transparency of the molded product. Consequently, such a product cannot be used in applications which require transparency and a lack of color at high temperatures.

Such a coloration is also considered to occur with the decomposition of the polymer. Thus, coloration is synonymous with an irregular reduction in the logarithmic viscosity number (intrinsic viscosity) of the polymers constituting the molded articles. Coloration and reduction of intrinsic viscosity deteriorates the useful properties of these polymers and are therefore extremely disadvantageous in obtaining products which are uniform.

SUMMARY OF THE INVENTION

A first object of this invention is to provide an aromatic polyester composition that is stabilized against heat and which can be used to produce molded articles which are free from coloration and which do not develop coloration even in use at high temperatures.

A second object of the invention is to provide an aromatic polyester composition which is stabilized against decomposition and reduction of intrinsic viscosity at elevated temperatures.

Extensive investigations have been made in order to remove the defects of aromatic polyesters described above. These investigations led to the discovery that the above-described undesirable coloration or heat decomposition and intrinsic viscosity reduction of aromatic polyesters can be markedly reduced by adding specified amounts of at least one specific organophosphorus, -oxygen, -sulfur, or -fluorine-containing compound to the aromatic polyester and that very stable aromatic polyester compositions are provided.

Accordingly, the present invention provides an aromatic polyester composition which comprises:

(A) an aromatic polyester derived from (a) terephthalic acid and/or a functional derivative thereof; or isophthalic acid and/or a functional derivative thereof; or mixtures thereof with the terephthalic acid unit-/isophthalic acid unit mole ratio being about 9:1 to about 1:9 and (b) a bisphenol of the general formula (I)

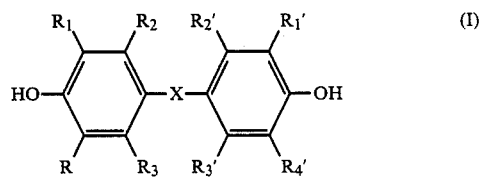

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, is a member selected from the group consisting of a hydrogen atom, a chlorine atom, a bromine atom and an alkyl group containing 1 to 4 carbon atoms, or functional derivatives thereof and (B) a stabilizer selected from organophosphorus, -oxygen, -sulfur, and -fluorine-containing compounds. The amount of the stabilizer to be added relative to the aromatic polyester (A) will vary depending upon the specific stabilizer used. Broadly, the stabilizer will be present in amounts ranging from about 0.01 to less than 2% by weight relative to the aromatic polyester (A).

DETAILED DESCRIPTION OF THE INVENTION

Molded products made from the aromatic polyester composition of this invention have markedly reduced coloration, and, even when exposed to high-temperature conditions, the molded products develop little coloration and show good stability to heat.

The aromatic polyester used in this invention is obtained from terephthalic acid and/or isophthalic acid and/or functional derivatives thereof and a bisphenol of the following general formula (I)

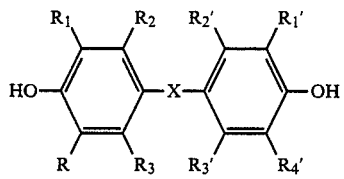

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which may be the same or different, each is selected from the group consisting of a hydrogen atom, a chlorine atom, a bromine atom and an alkyl group containing 1 to 4 carbon atoms, or functional derivatives thereof.

A mixture of about 90 to about 10 mole % of terephthalic acid and/or a functional derivative thereof and about 10 to about 90 mole % of isophthalic acid and/or a functional derivative thereof is preferred for use as the acid component to be reacted with the bisphenol to prepare the aromatic polyester as referred to in this invention. Preferably, a mixture of 20 to 80 mole % of terephthalic acid and/or a functional derivative thereof and 80 to 20 mole % of isophthalic acid and/or a functional derivative thereof is used. The molar ratio of bisphenol to the sum of the terephthalic acid units and isophthalic acid units is substantially equimolar.

Suitable functional derivatives of terephthalic or isophthalic acid which can be used include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of terephthalic and isophthalic acids containing 1 to 6 (especially 1 to 2) carbon atoms in each alkyl moiety thereof. Preferred examples of diaryl esters include diphenyl terephthalate and diphenyl isophthalate.

Examples of suitable bisphenols of the general formula (I) above are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) sulfone, bis(4-hydroxyphenyl) ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4'-hydroxyphenyl)ethane, 2,2-bis(4'-hydroxy-3'-methylphenyl)propane, 2,2-bis(4'-hydroxy-3'-chlorophenyl (propane, 2,2-bis(4'-hydroxy-3',5'-dichlorophenyl)propane, 2,2-bis(4'-hydroxy-3',5'-dibromophenyl)propane, and 1,1-bis(4'-hydroxyphenyl)-n-butane. 2,2-bis(4'-hydroxyphenyl)propane, bisphenol A, is most typical and is readily available, and, accordingly, is most often used.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

To produce these aromatic polyesters, the interfacial polymerization method which comprises mixing a solution of an aromatic dicarboxylic acid chloride in a water-immiscible organic solvent with an alkaline aqueous solution of bisphenol, the solution polymerization method which comprises heating a bisphenol and an acid chloride in an organic solvent, and the melt polymerization method which comprises heating a phenyl ester of an aromatic dicarboxylic acid and bisphenol, which are described in detail in U.S. Pat. Nos. 3,884,990, and 3,946,091, can, for example, be employed.

In order to insure the aromatic polyesters used in this invention have good physical properties they should have an intrinsic viscosity (IV), defined by the following relationship, of about 0.3 to about 1.0, preferably 0.4 to 0.8, $$IV = -1 + \frac{\left[\left[\frac{t_1}{t_2} - 1\right]4K' + 1\right]^{\frac{1}{2}}}{4K'(C)}$$

wherein $t_1$ is the falling time (in seconds) of a solution of the aromatic polyester in a solvent; $t_2$ is the falling time (in seconds) of the solvent; C is the concentration (in g/dl) of the aromatic polyester in the solution; and K' is a constant. For the aromatic polyesters of this invention K' will be about 0.42. The intrinsic viscosity, as used herein, is determined in 1,1,2,2-tetrachloroethane at 30° C.

While any of the interfacial polymerization method, solution polymerization method and melt polymerization method described above can be used to produce the aromatic polyesters used in this invention, it has been found that, depending on the polymerization method used, differing amounts of stabilizer are required for effectiveness in reducing coloration and polymer decomposition. Thus, the melt polymerization method of forming the aromatic polyester is preferred. In certain circumstances, the amount of stabilizer added to a melt polymerized aromatic polyester required to achieve the objectives of this invention can be substantially reduced relative to amounts of stabilizer which might be expected to yield improvements when added to interfacially polymerized aromatic polyesters.

The present polymerization process is carried out in the presence of an acidic, neutral or basic catalyst, such classifications being based on the reaction of a conventional acid-base indicator and the catalyst when the latter is dissolved in a polar ionizing solvent such as water.

More preferably, a basic catalyst is employed. Prior to its introduction into the reaction mass, the preferred basic catalyst is preferably converted to liquid form, e.g. by melting or by dissolution in a liquid or normally solid, low melting solvent.

Suitable basic catalysts include the alkali metals, such as lithium, sodium, potassium, rubidium, cesium and francium and the carbonates, hydroxides, hydrides, borohydrides, phenates, bisphenates, (i.e. salt of a bisphenol or bisphenol), carboxylates such as acetate or benzoate, oxides of the foregoing alkali metals. Group II and III elements can also be used in place of the alkali metals of the foregoing classes of compounds such as metals and compounds of calcium, magnesium and aluminum. Other gases include trialkyl or triaryl tin hydroxides, acetates, phenates, and the like.

Examples of catalysts are lithium, sodium, potassium, rubidium, cesium and francium metals, potassium or rubidium carbonate, potassium hydroxide, lithium hydride, sodium borohydride, potassium horohydride, calcium acetate, magnesium acetate, aluminum triisopropoxide and triphenyl tin hydroxide.

Phenol is the preferred solvent for the normally solid catalysts. Substituted phenols which can be used include those having the formula

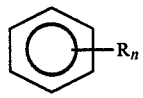

wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2.

Typical solvents include o-benzyl phenol, o-bromo phenol, m-bromo phenol, m-chloro phenol, p-chloro phenol, 2,4 dibromo phenol, 2,6 dichloro phenol, 3,5 dimethoxy phenol, o-ethoxy phenol, m-ethyl phenol, p-ethyl-phenol, o-isopropyl phenol, m-methyoxy phenol, m-propyl phenol, p-propyl phenol, and the like.

Other solvents which are particularly useful are of the ether type, for example, tetrahydrofuran and the various glymes, for examples, ethylene glycol dimethylether and the like.

Combinations of catalyst and combinations of phenols or phenols and solvents may also be used.

Especially preferred liquid basic catalysts are charqed dissolved in molten normal solid-low melting organic solvent such as phenol. Especially preferred catalysts providing excellent results are the basic catalysts, rubidium phenoxide, potassium phenoxide, and potassium borophenoxide, each dissolved in molten phenol.

Preferably, also when a basic catalyst is employed, the catalyst is introduced concurrently with the aforementioned molten reactants to the polymerization reactor to avoid heating the reactants in the presence of the catalyst prior to onset of the polymerization.

Less preferred catalysts include the metal oxides, metal acetates, titanium and tin compounds. Suitable metal oxides include antimony trioxide, germanium oxide, arsenic trioxide, lead oxide, magnesium oxide, and zinc oxide. Suitable metal acetates include cobalt acetate, zinc acetate, cadmium acetate and manganese acetate. Suitable titanium compounds include the organic titanates such as tetrabutyl titanate and tetraisopropyl titanate. Suitable tin compounds include dibutyloxide, dibutyl tin methoxide and dibutyl tin dilaurate.

In accordance with conventional reaction practice, a catalytically effective amount of the catalyst is employed, for example, about 0.005 to about 2 mol percent or more, preferably about 0.01 to 1 mole percent of the bisphenol in accordance with known techniques of polyester formation.

The present process can be carried out employing, in general, conditions which are conventional for melt polymerization.

According to the conventional practice, the solid reactants are heated above about 100° C., preferably above about 160° C. to melt the reactants. Onset of reaction in the presence of catalyst is generally at a temperature ranging from above about 100° C. to about 275° C., for example, above about 160° C. for reaction of bisphenol A, diphenyl terephthalate and diphenyl isophthalate. The reaction temperature employed is generally above about 100° C. to about 400° C. or higher, preferably above about 175° C. to about 350° C., more preferably about 175° C. to about 330° C. with the reaction temperature being raised gradually during the polymerization.

In the reaction, the aryl group of the diester is displaced as the corresponding relatively volatile monohydroxy aromatic compound, e.g. phenol, for which provision is made for removal e.g. by distillation from the reaction mixture during the tranesterification. Reaction pressure is generally diminished during the reaction, e.g. of about 0.1 mm. of mercury or lower, to aid in the aforementioned removal of the monohydroxy aromatic compound.

Generally, it is preferable in accordance with the prior art to carry out reaction in two stages. The first or prepolymerization stage is carried out at above about 100° C. to about 350° C. preferably about 160° C. to about 330° C., especially about 180° C. to about 300° C. to prepare a low molecular weight polyester or prepolymer of relatively low intrinsic viscosity, e.g. of less than about 0.1 to about 0.3 dl./g. A subsequent polymerization stage in which the prepolymer is heated at a somewhat higher temperature namely, at above about 200° C. to about 400° C. or higher, preferably at about 225° C. to about 350° C., especially at about 275° C. to about 330° C. Conveniently, the polymerization stage is carried out in a different reaction vessel from that employed in the prepolymerization reaction stage with effective agitation of reaction mixture in both stages with generally more extreme agitation being used in the polymerization.

In carrying out the present invention, it is preferred prior to catalyst addition to melt the normally sold reactants to provide molten reactants and then heat the reactants if necessary to a temperature sufficient for onset of polymerization. According to this embodiment, a basic catalyst for the polymerization that is normally solid at 30° C. is then introduced in the liquid form to the polymerization concurrent with the molten reactants.

According to another preferred embodiment of the invention, there is contemplated a semi-continuous process for polymerization wherein the prepolymerization stage of the process is carried out batchwise and the subsequent polymerization stage is carried out substantially continuously in one or more counter-current flow mechanically agitated thin film or wiped film reactors.

As an alternative to the aforementioned semi-continuous mode of operation, another preferred embodiment of the invention contemplates a fully continuous polymerization wherein, the prepolymerization is carried out in one or more stirred tank reactors, and preferably, the polymerization stage is carried out in one or more of the aforementioned wiped film reactors or thin film reactors.

It is especially preferred in carrying out semi- or fully continuous polymerization according to the aforementioned preferred modes of operation to complete polymerization in a polymerization reaction zone wherein the aforementioned wiped film reactor is followed by a multi-screw extrusion reaction vessel.

A persistent problem in the preparation of linear polyesters of bisphenol and dicarboxylic acids has been the undesirable high color in the product, i.e. the tendency of the polyester to develop an undesirable yellow color during the polyesterification. The color is attributed to thermal decomposition of the product polyester and/or the reactants in the reaction which is carried out at high temperatures ranging up to 400° C., or higher, and generally in the melt, i.e. without the use of a diluent.

In accordance with this invention, various stabilizers have been found which when added to the aromatic polyesters of this invention greatly improve the undesirable coloration and depolymerization which typically develop. The organophosphorus compounds which are useful as stabilizers in the present invention include phenyl phosphates having the following general formula II.

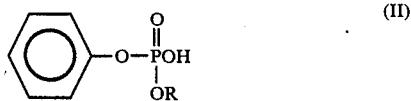

Wherein R is H, alkyl or aryl. The preferred phosphate stabilizer is diphenyl phosphate.

Additionaly, phenyl phosphites are also applicable on this invention including those having structural formulas III, and IV.

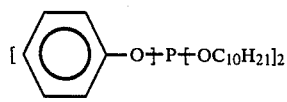

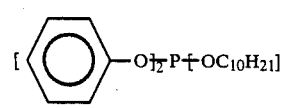

Diphosphites having structural formulas V and VI are also useful in stabilizing the aromatic polyester compositions of this invention.

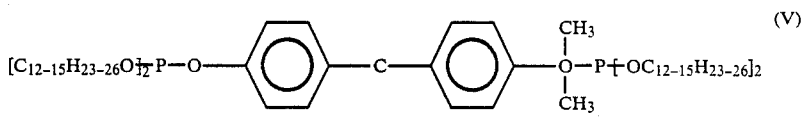

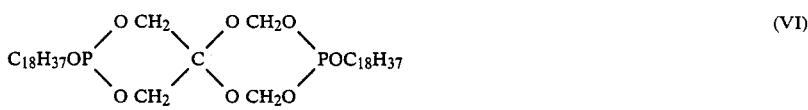

The oxygen-containing organic compound utilized in this invention is a polyphenylene oxide having the general formula VII.

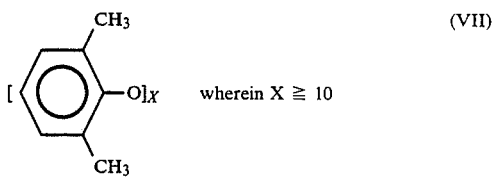

The organosulfur compound which is useful comprises 2-mercaptobenzimidazole which has the following structure (VIII).

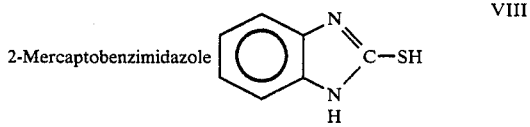

Additionally, a fluorocarbon wax is also useful as a stabilizer in the present invention. Such wax will have the following structural formula (IX).

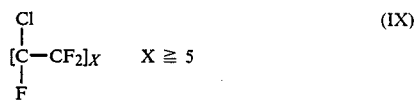

Mixtures of the above-described stabilizers have also been found useful to meet the objectives of this invention.

The amount of the stabilizer to be added to the aromatic copolyester differs according to the type of the stabilizer used, but should be about 0.01 to less than about 2% by weight, preferably 0.02 to 1.0% by weight, based on the weight of the aromatic copolyester. If the amount of the stabilizer is less than about 0.01% by weight, the effect of preventing coloration and heat decomposition is not sufficient, and if the amount of the stabilizer exceeds about 2% by weight, the dynamic properties of the aromatic copolyester tend to be deteriorated.

Various methods can be used to add the stabilizer to the aromatic polyester. In the interfacial polymerization method in which a solution of a dicarboxylic acid chloride in an organic solvent and an alkaline aqueous solution of a bisphenol are stirred, the stabilizer can be added to either one of the monomers prior to polymerization. When the polymerization product is isolated as a solution of the aromatic polyester after the polymerization, a solution of the stabilizer may be added to the aromatic polyester solution. When the aromatic polyester is isolated as a solid, the stabilizer can of course be simply added to the aromatic polyester. Furthermore, the stabilizer may be incorporated in the aromatic polyester by immersing the aromatic polyester in a solution or suspension of the stabilizer in a solvent such as methanol or acetone, and removing the solvent by evaporation after the immersion. In the preferred method of melt polymerization, the stabilizer may be fed together with the monomers at the time of polymerization. Alternatively, the stabilizer may be added to chips or powders of the aromatic polyester during a molding operation such as injection molding, extrusion molding, etc. If the stabilizer is added to a powder or chips of the aromatic polyester and the mixture is molded; molded articles having a uniform color and uniform characteristics can be obtained. It is preferred in melt polymerization to add organophosphorus stabilizers at the beginning of melt polymerization in order to have the antioxidant advantage as soon as possible. However, if there is any moisture present, the organophosphorus esters hydrolyze and form free acids that may neutralize the polymerization catalyst. Therefore, it is better to add this type of stabilizer at some intermediate polymerization stage where the presence of moisture is not very likely. It should also be recognized that the presence of the stabilizer in the polymer as it is made gives better color stability on heating than if the same product is added to a polymer that is made without any stabilizer.

The aromatic polyester composition of this invention may further contain various other additives such as antioxidants, ultraviolet absorbers, antistatic agents and fire retardants, as needed according to the purpose of use. For example, the effect of the present invention can be increased further by adding the stabilizer in conjunction with an antioxidant. Examples of suitable antioxidants are conventional phenolic antioxidants, phosphite-type antioxidants, amine-type antioxidants sulfur-containing compounds, organometallic compounds, and epoxy compounds. In addition, plasticizers, pigments and lubricants can also be incorporated in the aromatic polyester composition of this invention. Alternatively the aromatic polyester composition may be einforced with glass fibers.

When an aromatic halogen compound such as decabromodiphenyl oxide is added to a resin composition to render the resin composition fire retardant, a molded article prepared from the composition frequently turns yellowish brown presumably due to heat decomposition. In such a case, too, the aromatic polyester composition of this invention is stabilized against heat, and coloration is markedly prevented.

If desired, the aromatic polyester composition of this invention may contain at least one additional polymer such as polyalkylene terephthalates (e.g., polyethylene terephthalate or polybutylene terephthalate), poly(ethylene oxybenzoate), polycarbonates, polyethylene, polypropylene, polyamides, polyurethanes, polystyrene, ABS resins, EVA copolymers, polyacrylates, polytetrafluoroethylene, polymethyl methacrylates, polyphenylene sulfide, and rubbers. In other words, a mixture of the aromatic polyester and another polymer exemplified above can be used. The stabilizer used in this invention exhibits a marked effect in this case, too.

A decrease in the degree of coloration or degradative decomposition of the aromatic polyester composition of this invention occurs when such is exposed to heat during molding or used at high temperatures.

Hence, the aromatic polyester compositions of this invention can be used to form many useful articles employing generally known molding methods such as injection molding, extrusion molding or press molding. Typical examples of final products obtained by moding are films, monofilaments, and injection molded articles such as machine parts, automobile parts, electrical component parts, vessels and springs. The aromatic polyester compositions of this invention also are particularly useful as engineering plastics for various applications where the excellent properties of aromatic polyesters are required.

The following examples are given to illustrate the present invention in more detail. It should be noted that the invention is in no way to be construed as being limited to these Examples. Unless otherwise indicated all parts, percents, ratios and the like are by weight.

EXAMPLE 1

18.492 Kg (81.0 moles) bisphenol A and 25.910 Kg (81.4 moles) 75/25 diphenyl iso/terephthalate were dried and charged to a melt tank under nitrogen. When molten (about 180° C.), the monomers were transferred to a stirred reactor (nitrogen blanketed). 0.041 moles of potassium phenate catalyst in phenol were charged to the stirred reactor (100 cc catalyst+solution). Vacuum was applied gradually and the temperature raised. After about 2½ hours, the temperature was about 280° C., pressure about 70 mmHg and the intrinsic viscosity (measured in 1,1,2,2 tetrachloroethane at 30° C.) was about 0.17 dl/g. The material was gradually transferred to a vertical falling film reactor at about 300° C. and about 5 mmHg absolute where an intrinsic viscosity of about 0.4 dl/g was reached and finally to a twin screw vented extruder at about 330° C. and 0.8 mmHg where the intrinsic viscosity reached 0.58–0.61 dl/g. The material was light yellow, clear and tough and was pelletized as it was extruded after cooling.

A batch of the above material was blended to assure uniformity. About 10% of the material was ground to about 0.5 mm mesh using a small grinder. The polymer was dried at about 120° C. overnight in a vacuum oven prior to use.

In each instance below, 20 grams of the finely ground polymer was blended with the stabilizer additive in a micromill. The material was then blended with 280 grams of the pelletized polymer, keeping the material as dry as possible throughout the whole procedure. The blended material was extruded at 370° C. in a Brabender single screw extruder through a slit die (340° C.). The extrudate was cut into pieces about 6 inches long. Several of the pieces were compression molded to about 30 mils in a Carver Press at about 500° F.

A piece of extrudate and a compression molded sample of each type along with a control sample were aged at 170° C. in a circulating air oven. A piece of each extrudate was also immersed in boiling water. After weekly intervals, the I.V. of the extrudate samples and the color of the compression molded samples were checked.

The results of the testing are summarized in Table 1 and FIGS. 1-6. It can be seen from Table 1 and the Figures that substantial reduction in loss of intrinsic viscosity on aging has occurred with the samples containing the various stabilizing additives as compared to the control sample without additive.

TABLE 1

| Stabilizer (average of 6) | Wt. % | Initial I.V. | I.V.[1] after days at 170° C. | | | | | | Y.I.[2] after days at 170° | | |
|---|---|---|---|---|---|---|---|---|---|---|---|
| | | | 7 | 14 | 21 | 28 | 35 | 56 | 0 | 7 | 14 |
| None | — | 0.56 ± 0.01 | 0.49 | 0.45 | 0.41 | 0.38 | 0.34 | 0.30 | 31 ± 2 | 46 ± 3 | 68 ± 4 |
| 2-mercaptobenzimidazole | 0.10 | 0.55 | 0.54 | 0.52 | 0.50 | 0.49 | 0.46 | 0.38 | | | |
| Mark 517* | 0.10 | 0.54 | 0.52 | 0.50 | 0.48 | 0.46 | 0.43 | — | 25 | 42 | 61 |
| PPO + Mark 1500** | 1.0, 0.14 | 0.55 | 0.53 | 0.51 | 0.48 | 0.47 | 0.44 | — | 25 | 54 | 82 |
| Diphenyl Phosphate | 0.05 | 0.55 | 0.53 | 0.51 | 0.49 | 0.47 | 0.45 | 0.38 | 29 | 40 | 59 |
| Daifloil*** | 0.25 | 0.54 | 0.52 | 0.51 | 0.49 | 0.48 | 0.44 | 0.39 | 46 | 70 | 91 |
| Daifloil + Diphenyl Phosphate | 0.25, 0.05 | 0.56 | 0.53 | 0.52 | 0.50 | 0.49 | 0.46 | 0.39 | 36 | 44 | 61 |

[1]I.V. —Intrinsic Viscosity dl/g (measured at 30° C. in 1,1,2,2 tetrachloroethane)
[2]Y.I. —Yellowness Index (measured on the Hunterlab Spectrophotometer)
*Phosphite of general formula (III)
**Phosphite of general formula (V)
***Fluorocarbon wax of general formula (IX)

EXAMPLE 2

The additives used in Example 1 were also prepared by casting a film (about 4 mils thick) in a flat dish from a solution of the polyester containing the additive. The film was air dried and then hung in a circulating air oven. The intrinsic viscosity was checked periodically. Color was also inspected by visual comparison with the control. Results are shown in Table 2.

TABLE 2

Polyester Films Aged at 170° C. for 25 days.

| Additive | Level (wt. %) | I.V. (dl/g) |
|---|---|---|
| None | — | 0.58 |
| None | — | 0.57 |
| Diphenyl phosphate | 0.25 | 0.45 |
| Octyl phenyl acid phosphate | 0.25 | 0.48 |

As can be seen from Example 2, "high" levels of diphenyl phosphate and the acid phosphate actually degraded the polyester. Thus, a melt prepared polyester containing a low level (0.05 wt. %) of diphenyl phosphate was found to be beneficial while 0.25 wt. % actually reduced the stability of the polyester. This is contrary to results reported with interfacially prepared bisphenol A-iso/terephthalate where up to 0.5 wt. % of various acid phosphates were reported to be beneficial (see U.S. Pat. No. 4,123,420). It is clear that polyesters with similar compositions but prepared by different processes will behave differently in the presence of the same stabilizer.

EXAMPLE 3

Samples of the polyester and the polyphenylene oxide stabilizer were formed into a film as in Example 2. The I.V. of the air dried film as well as color were inspected periodically. The results are shown in Table 3.

TABLE 3

| Additive | Level | Intrinsic Viscosity (dl/g) | |
|---|---|---|---|
| | | 22 days | 43 days |
| None | — | 0.55 | 0.50 |
| PPO | 1.0 | 0.60 | 0.57 |
| PPO | 0.25 | 0.58 | 0.53 |

From Table 3, it can be seen that the polyphenylene oxide stabilizes the aromatic polyester and is slightly more effective at the 1.0 wt. % level than at the lower level. In addition, it was observed that the polyphenylene oxide containing samples darkened much more than the control sample. Referring to Table 1, it can be seen that when polyphenylene oxide is used in combination with a phosphite, the stabilizing activity is quite good and its color stability is improved.

What is claimed:

1. A resin composition comprising:
(A) an aromatic polyester produced by polymerizing a substantially equimolar mixture of the monomeric components
   (a) terephthalic acid units selected from the group consisting of the acid halide, dialkyl ester and diaryl ester thereof and/or isophthalic acid units selected from the group consisting of the acid halide, dialkyl ester and diaryl ester thereof, and
   (b) at least one bisphenol of the general formula (I)

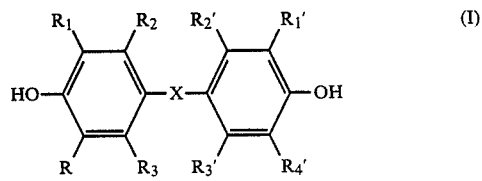

wherein —X— is selected from the group consisting of —O—, —S—, —SO$_2$—, —SO—, —CO—, an alkylene group containing 1 to 4 carbon atoms and an alkylidene group containing 1 to 4 carbon atoms, and R$_1$, R$_2$, R$_3$, R$_4$, R$_1'$, R$_2'$, R$_3'$, and R$_4'$, which may be the same or different, each is selected from the group consisting of a hydrogen atom, a chlorine atom, bromine atom, and an alkyl group containing 1 to 4 carbon atoms, or a metal salt or diester of said bisphenol of the general formula (I), and
(B) about 0.01 to less than about 2% by weight, based on the aromatic polyester (A) of a polyphenylene oxide stabilizer of the general formula:

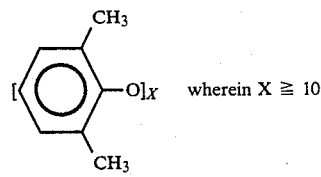

wherein X ≧ 10

2. The composition of claim 1 wherein said aromatic polyester is produced by polymerizing a mixture of said terephthalic acid and isophthalic acid units with said bisphenol.

3. The composition of claim 1 wherein the mole ratio of the terephthalic acid unit to the isophthalic acid unit is 8:2 to 2:8.

4. The composition of claim 1 wherein the mole ratio of terephthalic acid unit to isophthalic acid unit is 1:3.

5. The composition of claim 2 wherein said aromatic polyester is formed by melt polymerization of said mixture of terephthalic and isophthalic acid units and said bisphenol.

6. The composition of claim 2 wherein said polyphenylene oxide is present in amounts of at least 1.0 wt. % based on said aromatic polyester.

7. The composition of claim 5 wherein said mixture comprises a mixture of diaryl esters of said terephthalic acid and isophthalic acid.

8. The composition of claim 7 wherein said diaryl ester is a diphenyl ester.

9. The composition of claim 1 wherein said bisphenyl is bisphenol A.

* * * * *